United States Patent
Kuroda et al.

(10) Patent No.: US 6,804,452 B1
(45) Date of Patent: Oct. 12, 2004

(54) APPARATUS FOR GENERATING RECORDING SIGNAL INCLUDING IMAGE DATA AND COPY CONDITION INFORMATION

(75) Inventors: Kazuo Kuroda, Tokorozawa (JP); Hidejiro Higashi, Tokorozawa (JP); Yoshiaki Moriyama, Tsurugashima (JP); Kazumi Sugaya, Tsurugashima (JP); Keiichi Yamauchi, Meguro-ku (JP)

(73) Assignee: Pioneer Electronic Corporation, Tokyo-To (JP)

( * ) Notice: Subject to any disclaimer, the term of this patent is extended or adjusted under 35 U.S.C. 154(b) by 0 days.

(21) Appl. No.: 09/305,422

(22) Filed: May 5, 1999

(30) Foreign Application Priority Data

May 7, 1998 (JP) .......................................... 10-125114

(51) Int. Cl.[7] .......................... H04N 5/91; H04N 7/167
(52) U.S. Cl. ............................. 386/94; 386/95; 380/203
(58) Field of Search .............................. 386/46, 94, 95, 386/125–126; 380/203, 201; H04N 5/91, 7/167

(56) References Cited

U.S. PATENT DOCUMENTS

| | | | | |
|---|---|---|---|---|
| 5,134,496 A | * | 7/1992 | Schwab et al. ................ 386/94 |
| 5,991,499 A | * | 11/1999 | Yagasaki et al. ............... 386/94 |
| 6,115,533 A | * | 9/2000 | Tahara et al. .................. 386/94 |
| 6,137,952 A | * | 10/2000 | Hogan ........................... 386/94 |
| 6,271,887 B1 | * | 8/2001 | Ogino et al. ................... 386/94 |
| 6,345,146 B1 | * | 2/2002 | Sako et al. ..................... 386/94 |
| 6,374,036 B1 | * | 4/2002 | Ryan et al. ..................... 386/94 |

* cited by examiner

Primary Examiner—Vincent Boccio
Assistant Examiner—James A Fletcher
(74) Attorney, Agent, or Firm—Pitney Hardin LLP

(57) ABSTRACT

An apparatus for generating a recording signal by converting an image signal and outputting the generated recording signal to an external device is provided. The image signal included image data corresponding to an image to be displayed on a display. The image data includes a plurality of data pieces each corresponding to a different one of a plurality of image elements which compose the image. The apparatus includes: a control information placing device for placing a control information piece onto one of the plurality of data pieces corresponding to one of the plurality of image elements that is to be located at an outer edge portion of the image when the image is displayed on the display screen; and a generating device for generating the recording signal including the control information piece. The control information piece includes information to control an operation of the external device.

23 Claims, 7 Drawing Sheets

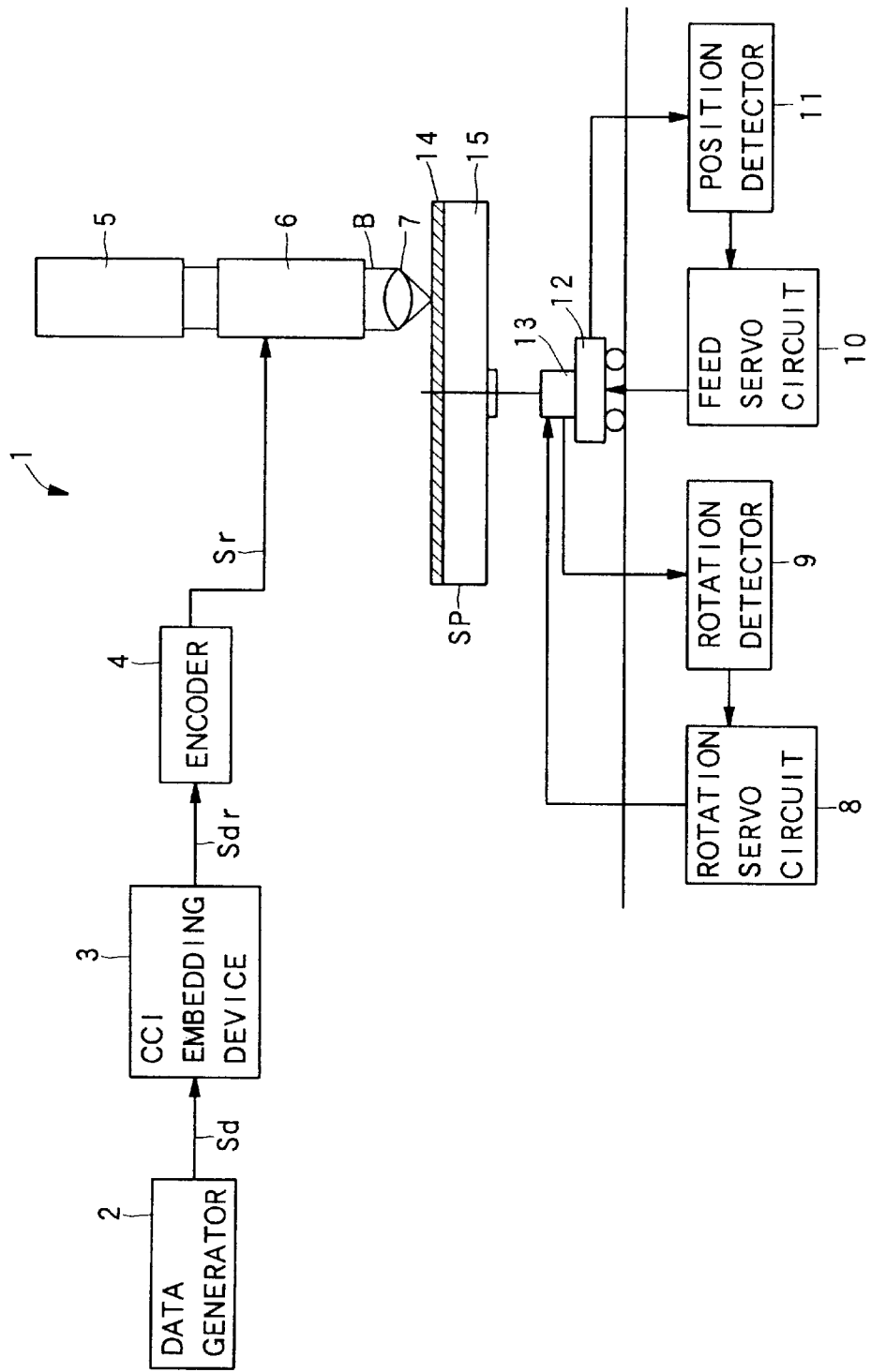

APPARATUS FOR GENERATING RECORDING SIGNAL INCLUDING IMAGE DATA AND COPY CONDITION INFORMATION

BACKGROUND OF THE INVENTION

1. Field of the Invention

The present invention relates to an apparatus for generating a recording signal including image data and control information intended for preventing the illegal copying of the image data, an apparatus for making a copy of the image data according to the control information, and a recording medium on which the image data and the control information are recorded.

2. Description of the Related Art

Generally, the image data or image information of movies or the like is protected by the copyright in many cases. The unauthorized copying of the image data protected by the copyright is basically prohibited. Therefore, a method is required to effectively prevent the illegal copying of the image data.

The illegal copying of the image data based on the NTSC (National Television System Committee) system is generally prevented by the method described below. Specifically, the copy condition information (hereinafter referred to as "CCI") is embedded beforehand in the portion of the signal containing image data which corresponds to the vertical blanking time. This CCI contains information indicating that copying the image data is prohibited or information indicating that copying the image data is permitted only once. Upon detection of the CCI when copying image data, it is possible to recognize whether the image data can be copied or copying it is prohibited.

However, the portion of the signal containing the image data which corresponds to the vertical blanking time performs the function of what is called the synchronizing signal. Therefore, this portion is not important as image data. This portion is often removed in signal processing such as the digitizing process. In the digitizing process for recording image data on a DVD, for example, the signal portion corresponding to the vertical blanking time is replaced with other synchronizing signals suitable for the digitizing processing.

When this digitizing process is executed, therefore, the CCI embedded in the portion corresponding to the vertical blanking time is lost. As a result, the copying of the image data cannot be effectively prevented by CCI.

SUMMARY OF THE INVENTION

It is therefore an object of the present invention to provide an image recording signal generating apparatus, an image recording signal recording apparatus, an copying apparatus, and a recording medium which can prevent the loss of the control information including the copy control information such as CCI and thus can prevent the illegal copying.

The above-mentioned object can be achieved by a recording signal generating apparatus according to the present invention. The recording signal generating apparatus is an apparatus for generating a recording signal by converting an image signal and outputting the generated recording signal to an external device. The image signal includes image data corresponding to an image to be displayed on a display screen of a display device. The image data includes a plurality of data pieces each corresponding to different one of a plurality of image elements which compose the image. The recording signal generating apparatus includes: a control information placing device for placing a control information piece onto one of the plurality of data pieces corresponding to one of the plurality of image elements that is to be located at an outer edge portion of the image when the image is displayed on the display screen; and a generating device for generating the recording signal by converting the image signal including the reproduction control information piece. The control information piece includes information to control an operation of the external device. In addition, the external device is, for example, a signal recording device, a signal transmission device, a signal reproducing device, a copying device, signal processing device or the like.

In this apparatus, the control information piece is placed onto one of the plurality of data pieces corresponding to one of the plurality of image elements that is to be located at an outer edge portion of the image when the image is displayed on the display screen. That is, the control information piece is placed onto an outer edge portion of the image. This means that the control information piece is contained in the image data. In other words, it becomes part of the image.

Therefore, as long as contents of the image data is not directly or drastically changed, the control information piece is maintained. Accordingly, the control information piece is maintained, if a process of converting a format of the image data into a different one while keeping contents of the image data, such as the aforementioned digitizing process, is carried out. Accordingly, it can be prevented that the control information piece is removed from the image.

In addition to this advantage, since the control information piece is placed onto the outer edge portion of the image, the control information piece is inconspicuous or invisible when the image is displayed on the display screen. For example, when the image is displayed on the display screen of a typical display device, the outer edge portion of the image is hidden by a screen frame or the like. In this case, the control information piece is invisible. Although the whole of the image is displayed in a visible state in another type of display device, the control information piece is located at the outer edge portion of the image, so that it is inconspicuous. Accordingly, the degradation of the quality of the image can be prevented.

The control information piece may include copy condition information indicating whether or not copying the recording signal is permitted. Therefore, the copy condition information can be always maintained, so that the image can be protected from illegal copying or the like.

Further, a copy protection information placing device may be added to the aforementioned recording signal generating apparatus. The copy protection information placing device is a device for placing a plurality of copy protection information pieces onto a plurality of data pieces each corresponding to different one of the plurality of image elements that is to be located at a part of the image to be displayed within a visible region of the display screen. Each of the plurality of copy protection information pieces is a watermark, for example. Further, information to identify the data piece on which the control information piece is placed may be placed onto the copy protection information pieces. Therefore, an authorized reproduction or copying apparatus can correctly detect the control information piece according to the copy protection information pieces. However, the effect of copy protection can be made strong, because it is very difficult or almost impossible for an unauthorized reproduction or copying apparatus to find the control information piece.

Furthermore, if each of the plurality of data pieces is pixel data corresponding to a pixel of the image, and if the pixel data includes a luminance value representing luminance of the pixel, the control information placing device places the control information piece onto the pixel data by replacing its luminance value with the control information piece. In this case, it is preferable that the control information placing device has: a calculation device for calculating an average of a first luminance value included in the data piece (i.e., pixel data) previous to a target data piece onto which the control information piece is to be placed and a second luminance value included in the data piece next to the target data piece; a generation device for generating the control information piece by changing the calculated average depending on whether or not copying the recording signal is permitted; and a replacing device for replacing the luminance value of the target data piece with the generated control information piece. Thus, the control information piece is generated on the basis of the an average of luminance values included in the neighboring data pieces located at both sides of the target data piece. Therefore, the value of the control information piece is close to these luminance values. That is, although the value of the control information is changed depending on whether copying the recording signal is permitted or not, a difference between the value of the control information piece and the luminance values of the neighboring data pieces is small. Consequently, the control information piece can be placed onto the image in such a way that it is inconspicuous or invisible, so that it can be prevented the degradation of the image.

The above-mentioned object can be also achieved by a signal recording apparatus according to the present invention. This apparatus can generate a recording signal by converting an image signal and record the generated recording signal onto a recording medium readably by an external device for reproducing the recording signal. The image signal includes image data corresponding to an image to be displayed on a display screen of a display device. The image data comprising a plurality of data pieces each corresponding to different one of a plurality of image elements which compose the image. The signal recording apparatus includes: a control information placing device for placing a control information piece onto one of the plurality of data pieces corresponding to one of the plurality of image elements that is to be located at an outer edge portion of the image when the image is displayed on the display screen; a generating device for generating the recording signal by converting the image signal including the reproduction control information piece; and a recording device for recording the generated recording signal onto the recording medium. The control information piece includes information to control an operation of the external device. Therefore, the image data including the control information can be recorded on the recording medium.

The above-mentioned object can be achieved by a recording medium according to the present invention. On this recording medium, reproduction data intended for a reproduction of an image is recorded. This reproduction data includes image data corresponding to the image to be displayed on a display screen of a display device. The image data includes a plurality of data pieces each corresponding to different one of a plurality of image elements which compose the image. Further, the reproduction data includes: a copy condition information piece placed on one of the plurality of data pieces corresponding to one of the plurality of image elements that is to be located at an outer edge portion of the image when the image is displayed on the display screen. The copy condition information piece indicates whether or not copying the image data is permitted.

In the reproducing data, the copy condition information piece is placed on an outer edge portion of the image. Therefore, as long as contents of the image data is not directly or drastically changed, the copy condition information piece is maintained. Accordingly, it can be prevented that the copy condition information piece is removed from the image, so that it can be effectively prevented illegal copying. In addition to this advantage, since the copy condition information piece is placed on the outer edge portion of the image, the copy condition information piece is inconspicuous or invisible when the image is displayed on the display screen. Accordingly, the degradation of the quality of the image can be prevented.

Further, in the recording medium, a plurality of copy protection information pieces may be added to the reproduction data. In this case, the copy protection information pieces are placed on a plurality of data pieces each corresponding to different one of the plurality of image elements that is to be located at a part of the image to be displayed within a visible region of the display screen. Further, these copy protection information pieces includes information to identify the data piece on which the copy condition information piece is placed. Therefore, when the reproduction data is read out and reproduced from the recording medium by an authorized reproduction or copying apparatus, such an apparatus can correctly detect the control information piece. However, the effect of copy protection can be made strong, because it is very difficult or almost impossible for an unauthorized reproduction or copying apparatus to find the control information piece. In addition, it is preferable that each of the copy protection information piece is a watermark.

The above-mentioned object can be achieved by an copying apparatus according to the present invention. This copying apparatus is an apparatus for copying reproduction data intended for reproducing an image with an external device. The reproduction data includes image data and a copy condition information piece, as stated above. The copying apparatus includes: an extraction device for extracting the copy condition information piece from the reproduction data; a determination device for determining on the basis of the extracted copy condition information piece whether or not copying the image data is permitted; and a copying device for copying the reproduction data if the determination device determines that copying the image data is permitted. Thus, by using this copying apparatus, it can be restricted copying the reproduction data. Therefore, it can be prevented illegal copying.

Furthermore, in this copying apparatus, a replacing device may be added to the copying device. The replacing device is a device for replacing the copy condition information piece currently placed on the data piece included in the image data with a new copy condition information piece indicating that copying is prohibited.

For example, if the current copy condition information indicates that copying is permitted, a copy of the reproduction data may be made. When the copy of the reproduction data is actually made, and it is recorded onto a recording medium for example, there is a case where it is needed to place this copy of the reproduction data into the state that it is not allowed to copying any more. In order to implement this, The replacing device replaces the currently copy condition information piece with the new copy condition information piece indicating that copying is prohibited.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a block diagram showing a cutting apparatus according to an embodiment of the invention.

DETAILED DESCRIPTION OF THE PREFERRED EMBODIMENTS

An embodiment of the present invention will be described with reference to the drawings. In the description that follows, the present invention is adapted to a cutting apparatus for fabricating a stamper disk of a DVD and an copying apparatus for copying the image data or image information reproduced from the DVD.

I. Outer Edge Area of Image

Generally, a display unit or a display device for displaying an image based on the NTSC system includes a CRT (cathode ray tube), a PDP (Plasma Display Panel), or the like. Such a display unit receives an image signal transmitted from a television broadcasting station, for example, and displays an image corresponding to the image data or image information contained in the image signal.

Figure 1A:
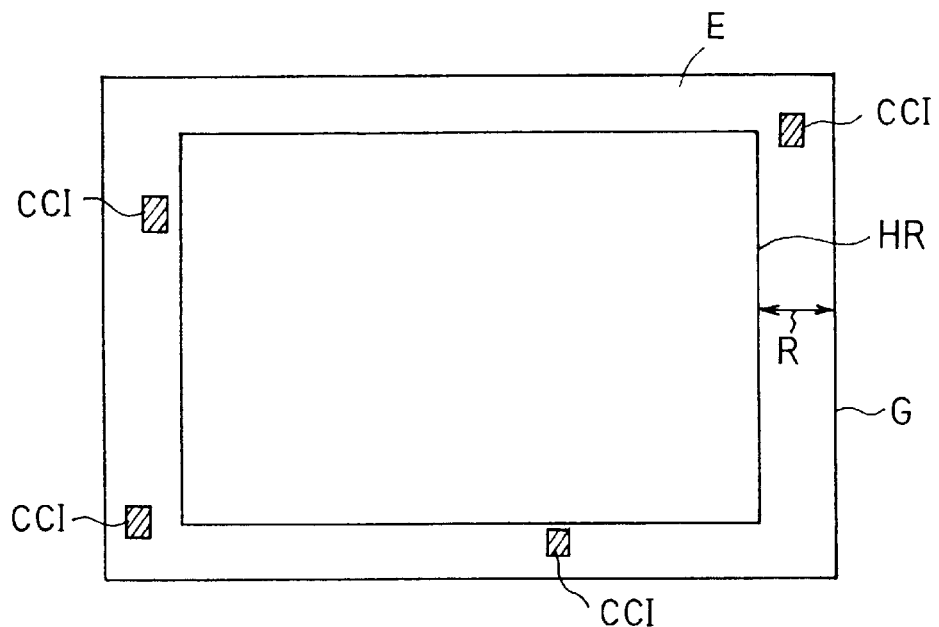
FIG. 1A is a diagram showing image data with copy condition information (CCI) embedded therein according to an embodiment of the present invention.

FIG. 1A shows the area of the image displayed on a display unit. As shown in FIG. 1A, the area of the image reproduced on the display unit is an area G. The area of the image that can be actually recognized visually by the user watching the display unit is an area HR (This area HR corresponding to a visible region of a display screen of the display unit). The area HR is smaller than the area G, and is generally located substantially at the center of the area G. The distance between the end side of the area HR and the end side of the area G is R. The distance R varies with the type of the display unit.

As described above, it is not that the display unit displays the entire area G of the image in a visually reconizable manner. Specifically, a virtual area HR is set a predetermined distance R inward of the outer edge (or the peripheral edge) of the image, and only the image within the area HR is displayed in a visually recognizable manner. Therefore, the outer edge area E of the image, though reproduced, is not displayed in a visually recognizable manner. For example, the outer edge area E is located under a screen frame of the display unit, and at a result, it is hidden by the screen frame.

The reason for providing the outer edge area is that the image quality is often deteriorated in the outer edge area E of the image under the influence of the synchronizing signal corresponding to the vertical blanking time, and it is better to hide this portion to supply a higher quality of image to the user.

A cutting apparatus according to an embodiment of the invention embeds a CCI in the outer edge area E of the image. Although one CCI is embedded in the outer edge area E in the cutting apparatus described below, a plurality of CCIs may be embedded in the outer edge area E as shown in FIG. 1A. Also, an copying apparatus according to an embodiment of the invention reads the CCI embedded in the outer edge area E of the image and determines whether the copying of the image data is permitted or prohibited.

Figure 1B:
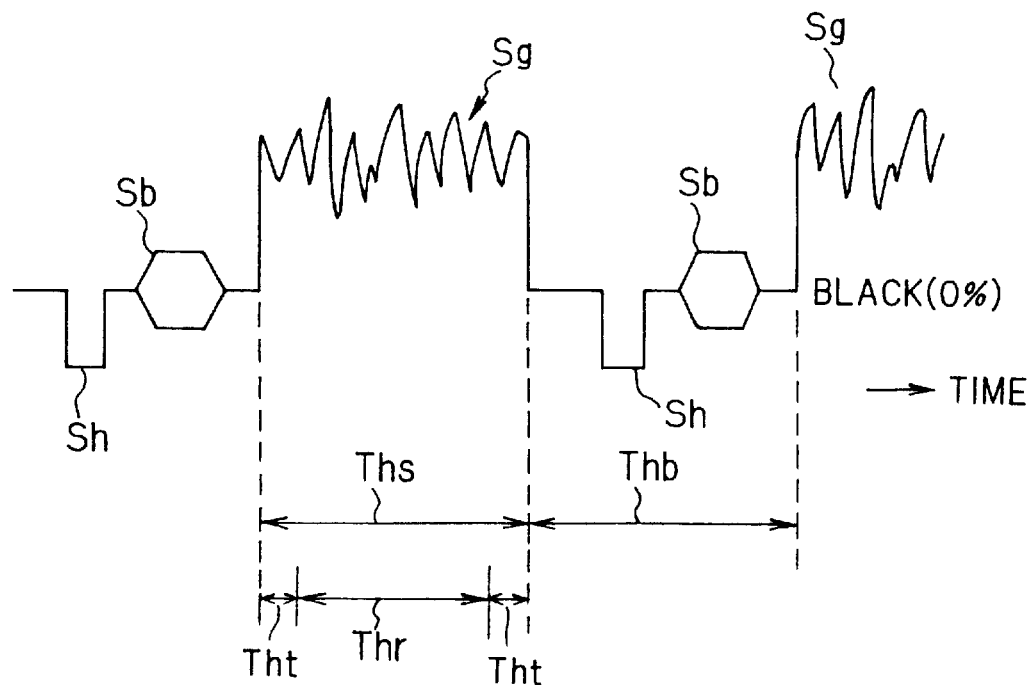
FIG. 1B is a diagram showing a waveform of a image signal containing the image data.

FIG. 1B shows an image signal for displaying an image on the display unit, i.e. an image signal of the NTSC system. This image signal contains a horizontal synchronizing signal Sh, a burst signal Sb, a main image signal Sg corresponding to the actual image, etc. The time corresponding to the main image signal Sg is the horizontal scanning time Ths, and the time between a given main image signal Sg and the next main image signal Sg is the horizontal blanking time Thb.

The portion of the horizontal scanning time Ths corresponding to the area HR (the image displayed in a visually recognizable manner) is the time Thr. This time will hereinafter be called the "visibly displayed time Thr". Further, the portion of the horizontal scanning time Ths corresponding to the outer edge area E of the image is the time Tht. This time will hereinafter be called the "invisibly displayed time Tht". The visibly displayed time Thr divided by the horizontal scanning time Ths is about 90% for the CRT, and about 97% for the PDP, for example.

In a cutting apparatus according to an embodiment of the invention, the CCI is embedded in the main image signal Sg corresponding to the invisibly displayed time Tht. This is indicative of the fact that the CCI is embedded in the outer edge area E of the image. The image signal with the CCI embedded therein is transmitted or recorded in a recording medium.

II. Cutting Apparatus

FIG. 2 shows a configuration of a cutting apparatus 1 according to an embodiment of the invention. The cutting apparatus 1 comprises a data generator 2, a CCI embedding device 3, an encoder 4, a laser generator 5, a light modulator 6, an objective lens 7, a spindle motor 13, a rotation detector 9, a rotation servo circuit 8, a feed unit 12, a position detector 11 and a feed servo circuit 10.

A stamper disk SP includes a resist 14 and a glass substrate 15. The cutting apparatus 1 sensitizes the resist 14 by the radiation of a light beam B thereby to form pits corresponding to the image data or the like in the resist 14.

The cutting apparatus 1 fabricates the stamper disk SP by the following operation.

First, the data generator 1 generates the data (image data) to be recorded in the disk. This data may contain audio information. Further, the data generator 1 converts this data into an analog signal based on the NTSC system, and outputs this analog signal to the CCI embedding device 3 as a data signal Sd.

Then, the CCI embedding device 3 embeds a CCI and a watermark (copy protection information or copyright information) in the data signal Sd and outputs the resulting signal as a embedded data signal Sdr.

The CCI contains the information indicating that copying the image data recorded in the disk is prohibited or the information indicating that the image data can be copied only once.

The watermark is the information indicating that the image data recorded in the DVD is produced legally. The watermark is embedded in the image area HR. The watermark is embedded in such a manner as to be hidden behind the image so that the image quality is not considerably deteriorated by embedding the watermark. Normally, the watermark embedded in this way cannot be recognized simply by watching the image.

The watermark contains (i) the information on the type of the recording medium (DVD in the present embodiment) in which the image data corresponding to the data signal Sd is recorded, (ii) the information indicating the type of the recording medium in which the image data is transmitted (in the case where the data recorded in the disk is transmitted by broadcasting, the medium used therefor, such as the cable television system or the satellite broadcasting system), (iii) the information on the copying of the data recorded in the disk (i.e. the information indicating whether copying is possible, copying is possible only once, or copying is prohibited), (iv) the information indicating the name of the owner of the copyright for the image data, and (v) the information indicating the position where the CCI is located in the image.

The encoder 4 processes the embedded data signal Sdr by such as interleave and eight-sixteen conversion thereby to generate the recording data signal Sr. In the process, the encoder 4 removes the portion of the embedded data signal Sdr corresponding to the vertical blanking time and, by adding a synchronizing signal anew, generates the recording data signal Sr.

The laser generator 5 outputs a light beam B toward the stamper disk SP in order to form pits. The light modulator 6 modulates the intensity of the light beam B output from the laser generator 5 using the recording data signal Sr. Then, the objective lens 7 converges the modulated light beam B on the resist 14 of the stamper disk SP.

At the same time, the spindle motor 13 rotates the stamper disk SP, and the rotation detector 9 detects the rotational speed of the stamper disk SP. Based on the rotational speed thus detected, the rotation servo circuit 8 controls the rotation of the stamper disk SP by servo. The feed unit 12 moves the spindle motor 13 and the stamper disk SP radially of the stamper disk SP in accordance with the rotation of the stamper disk SP in order to form a spiral track configured of a train of pits arranged on the stamper disk SP. In the process, the position detector 11 detects the position of the feed unit 12. The feed servo circuit 10 controls the movement of the feed unit 12 by servo based on the detected position of the feed unit 12.

As a result of the foregoing operation, the cutting apparatus 1 fabricates the stamper disk SP by forming a spiral track configured of pits corresponding to the recording data signal Sr on the resist 14 of the stamper disk SP. This stamper disk SP is used as a cutting die for fabricating the DVD.

After that, what is called the replication processing for molding the resin, forming a reflection film and forming a protective film is executed by use of the stamper disk SP. In this way, the DVDs constituting replica disks having pits corresponding to the recording data signal Sr are mass produced.

Figure 3:
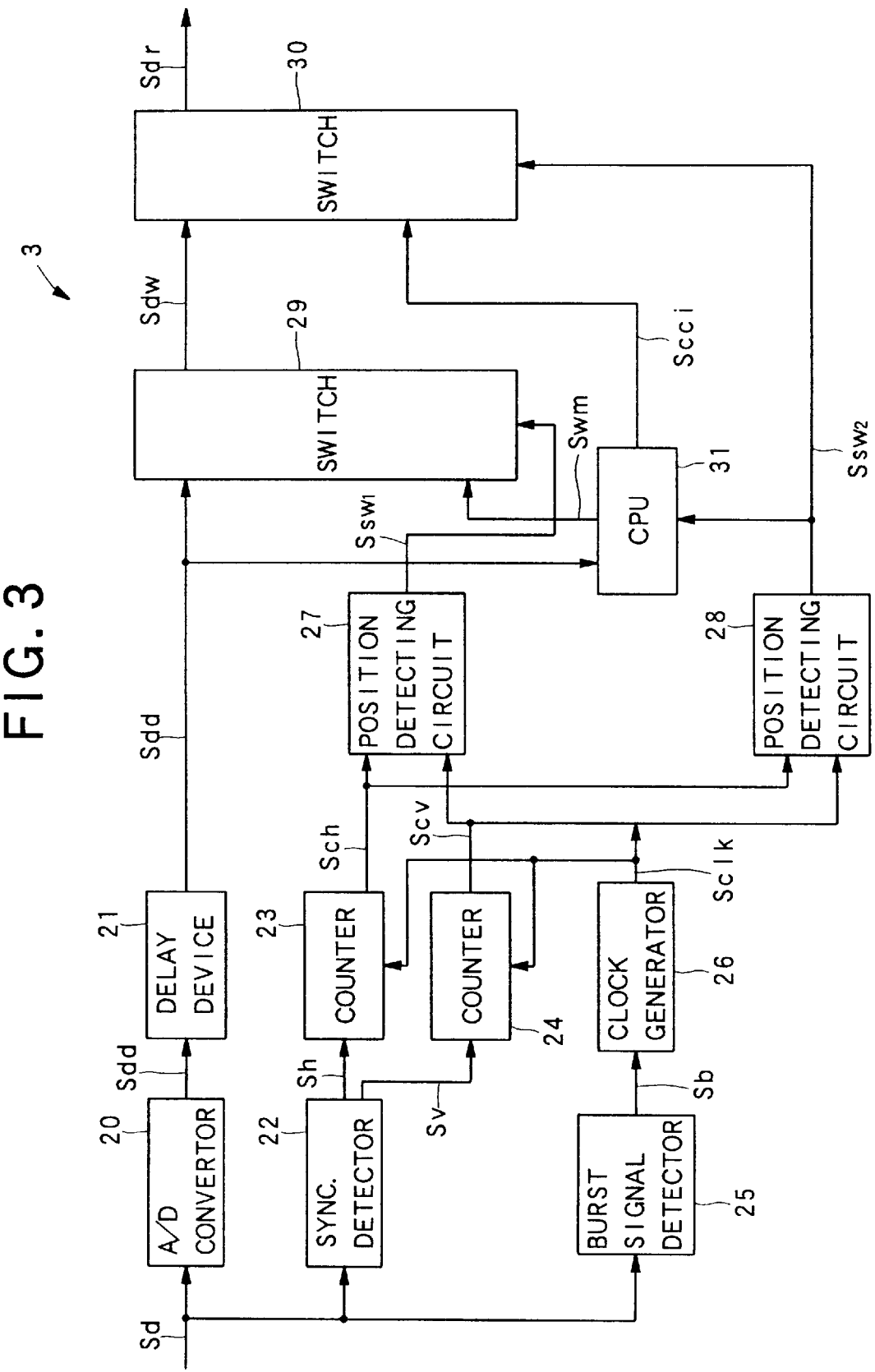
FIG. 3 is a block diagram showing a CCI embedding device of the cutting apparatus.

A configuration of the CCI embedding device 3 is shown in FIG. 3. In FIG. 3, the CCI embedding device 3 includes an A/D (analog/digital) converter 20, a delay device 21, a synchronization device 22, counters 23, 24, a burst signal detector 25, a clock generator 26, position detecting circuits 27, 28, switches 29, 30 and a CPU 31.

The position where the CCI is embedded in the image data and the position where the watermark is embedded in the image data are predetermined. The position information indicating these embedding positions is stored in a memory in the position detectors 27, 28 (not shown), respectively. In view of the fact that the CCI embedding device 3 embeds the CCI and the watermark in the data signal Sd, the position information stored in the position detectors 27, 28 actually represents the positions where the CCI and the watermark are embedded in the data signal Sd.

The CCI embedding device 3 embeds the CCI and the watermark in the image data by the operation described below.

First, upon application of the data signal Sd thereto from the data generator 2, the A/D converter 20 converts the data signal Sd into a digital signal and outputs it to the delay device 21 as a digital data signal Sdd.

The burst signal detector 25 detects the burst signal Sb contained in the data signal Sd, and outputs it to the clock generator 26. The clock generator 26, based on the burst signal Sb, generates a clock signal Sclk functioning as a reference clock for controlling the whole CCI embedding device 3. This clock signal Sclk is output to the counters 23, 24 and the other component elements of the CCI embedding device 3.

The synchronizing device 22 extracts the horizontal synchronizing signal from the data signal Sd and outputs it to the counter 23 as a horizontal synchronizing signal Sh. The synchronizing device 22 extracts the vertical synchronizing signal from the data signal Sd and outputs it to the counter 24 as a vertical synchronizing signal Sv.

The counter 23 counts the pulses of the clock signal Sclk input thereto during the period from the time point when a given horizontal synchronizing signal Sh is input to the time point when the next horizontal synchronizing signal Sh is input, and outputs the count to the position detecting circuits 27, 28 as a count signal Sch .

The counter 24 counts the pulses of the clock signal Sclk input thereto during the period from the time point when a given vertical synchronizing signal Sv is input to the time point when the next vertical synchronizing signal Sv is input, and outputs the count to the position detecting circuits 27, 28 as a count signal Scv .

The position detecting circuit 27 generates a position signal Ssw1 indicating the position where the watermark is to be embedded, based on the count signal Sch, the count signal Scv and the position information in a memory not shown, and outputs it to the switch 29. Assume, for example, that the watermark is embedded at four positions in the image area HR. Four position signals Ssw1 are output four times at predetermined timing while the signal associated with the image data passes through the switch 29.

The position detecting circuit 28 generates a position signal Ssw2 indicating the position where the CCI is to be embedded, based on the count signal Sch, the count signal Scv and the position information in a memory not shown, and outputs it to the switch 30 and the CPU 31. Assume, for example, that the watermark is embedded at four positions in the image area HR, as described above. Then, the CCI can be embedded at one of the 16 positions in the outer edge area E of the image. In order to realize this, the position signal Ssw2 is output at predetermined timing.

The delay device 21 delays the digital data signal Sdd by the time required for the process in the counters 23, 24 and the position detecting circuits 27, 28, and outputs the delayed digital data signal Sdd to one of the input terminals of the switch 29 and the CPU 31.

The CPU 31 generates a copyright information signal Swm indicating the contents of the watermark, and outputs it to the other input terminal of the switch 29. In the process, assuming that the watermarks are embedded at four positions in the area HR as described above, four types of copyright information signals Swm are output to the switch 29 at predetermined timing, respectively.

Each four of these watermarks constitute the information of the corresponding one of (i) to (v) above. Specifically, these information are each embedded as four separate watermarks.

The information indicating the position where a CCI is embedded, for example, is recorded in the fourth least significant bit of the pixel data (data corresponding to each pixel of the image) in which the watermark is embedded. The four-bit data obtained by combining the fourth least bits of four pixel data in which the watermarks are embedded represents the position where one CCI is embedded. Assume, for example, that four watermarks are embedded in the area HR. Since the information indicating the position where one CCI is embedded is four-bit data, one of the 16 positions arranged in the outer edge area E can be specified as the position where the CCI is embedded.

Further, the CPU 31 generates a CCI signal Scci indicating the contents of the CCI and outputs it to one of the input terminals of the switch 30. In the process, the CPU 31 generates the CCI in the following manner.

First, the CPU 31 calculates the average value between the value of the luminance contained in the pixel data immediately before the pixel data existing at the position where the CCI is to be embedded and the value of the luminance contained in the pixel data immediately after the pixel data existing at the position where the CCI is to be embedded. Then, the CPU 31, when embedding the CCI indicating that copying the image data is prohibited, outputs the average value directly as the CCI signal Scci. In the case where the CCI indicating that copying of the image data is permitted only once, on the other hand, the CPU 31 outputs the average value plus a predetermined offset value as the CCI signal Scci.

The switch 29, which is normally in the state permitting the passage therethrough of the digital data signal Sdd, turns to the state permitting the passage of the copyright information signal Swm only when the position signal Ssw1 is output. As a result, the embedded data signal Sdw is generated, in which the copyright information signal Swm is embedded in the digital data signal Sdd, at the timing indicated by the position signal Ssw1. This embedded data signal Sdw is output to the other terminal of the switch 30.

The switch 30, which is normally in the state permitting the passage therethrough of the embedded data signal Sdw, turns to the state permitting the passage of the CCI signal Scci only when the position signal Ssw2 is output. As a result, the embedded data signal Sdr is generated, in which the CCI signal Scci is embedded in the embedded data signal Sdw, at the timing indicated by the position signal Ssw2. This embedded data signal Sdr is output to the encoder 4.

After that, the encoder 4, the laser generator 5, etc. operate in such a manner that the data signal including the image data in which the watermark and the CCI are embedded is recorded in the stamper disk SP.

III. Copying Apparatus

Figure 4:
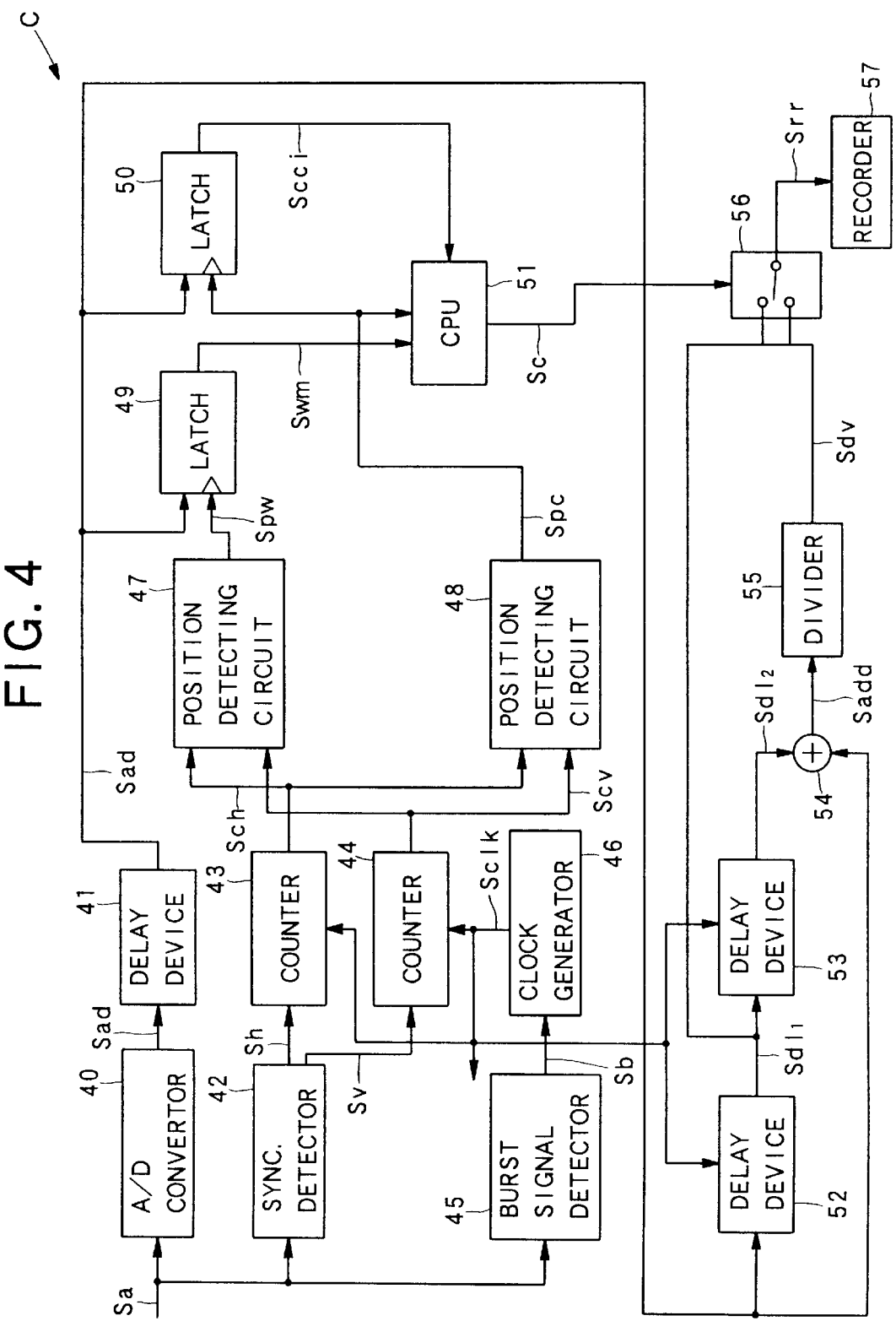
FIG. 4 is a block diagram showing an copying apparatus according to an embodiment of the invention.

FIG. 4 shows the copying apparatus C according to an embodiment of the invention. The DVD is mass produced by using the stamper disk SP fabricated by the cutting apparatus 1. Then, the DVD is reproduced in a satellite broadcasting or cable television broadcasting station. The reproduction signal obtained from the DVD is transmitted to the copying apparatus C as an analog data signal of NTSC system through the broadcasting medium of the satellite broadcasting system or the transmission medium of the cable television broadcasting system, as the case may be. The copying apparatus C then determines whether the analog data signal can be copied or not, based on the watermark and the CCI contained in the analog data signal received. In the case where the analog signal can be copied, the particular analog data signal is copied to another recording medium.

The copying apparatus C having the function described above comprises, as shown in FIG. 4, an A/D converter 40, delay devices 41, 52, 53, a synchronization device 42, counters 43, 44, a burst signal detector 45, a clock generator 46, position detecting circuits 47, 48, latches 49, 50, a CPU 51, an adder 54, a divider 55, a switch 56 and a recorder 57.

As described above, the positions where the CCI and the watermark are embedded in the image data are predetermined. The position information indicating these positions are stored in a memory included in the position detecting circuits 47, 48 (not shown), respectively. In view of the fact that the copying apparatus C copies the analog data signal, these position information actually indicate the positions where the CCI and the watermark are embedded in the analog data signal, respectively.

The copying apparatus C operates in the following manner. First, when the analog data signal Sa reproduced from the DVD and received through a broadcasting medium or a transmission medium is input to the copying apparatus C, the A/D converter 40 converts the analog data signal Sa into a digital signal and outputs a digital data signal Sad to the delay device 41.

The burst signal detector 45 detects the burst signal Sb in the analog data signal Sa and outputs it to the clock generator 46. The clock generator 46 generates a clock signal Sclk functioning as a reference clock for controlling the copying apparatus C, based on the burst signal Sb, and outputs it to the counters 23, 24, the delay devices 52, 53 and the other component elements of the copying apparatus C.

The synchronizing device 42 extracts the horizontal synchronizing signal from the analog data signal Sa and outputs it to the counter 43 as a horizontal synchronizing signal Sh. Further, the synchronizing device 42 extracts the vertical synchronizing signal from the analog data signal Sa and outputs it to the counter 44 as a vertical synchronizing signal Sv.

The counter 43 counts the pulses of the clock signal Sclk input thereto during the period from the time point when a given horizontal synchronizing signal Sh is input to the time point when the next horizontal synchronizing signal Sh is input, and outputs the count to the position detecting circuits 47, 48 as a count signal Sch.

The counter 44 counts the pulses of the clock signal Sclk input thereto during the period from the time point when a given vertical synchronizing signal Sv is input to the time point when the next vertical synchronizing signal Sv is input, and outputs the count to the position detecting circuits 47, 48 as a count signal Scv.

The position detecting circuit 47 generates a position signal Spw indicating the positions where the watermarks are embedded, based on the count signal Sch, the count signal Scv and the position information stored in a memory not shown, and outputs it to the reset terminal of the latch 49. In the case where the watermark is embedded at four positions distributively in the area HR, for example, the position signal Spw is output four times at predetermined timing during the period when the signal corresponding to the image data is being input to the latch 49.

The position detecting circuit 48 generates a position signal Spc indicating the positions where the CCI are embedded, based on the count signal Sch, the count signal Scv and the position information stored in a memory not shown, and outputs it to the reset terminal of the latch 50 and the CPU 51. For example, the position signal Spc is output at predetermined timing corresponding to the positions where the CCI are embedded.

The delay device 41 delays the digital data signal Sad by the time required for the processing in the counters 43, 44 and the position detecting circuits 47, 48, respectively, and outputs the resulting signal to the input terminals of the latches 49, 50, the delay device 52 and the adder 54.

The latch 49 reads the watermarks from the digital data signal Sad at the timing indicated by the position signal Spw, and outputs the copyright information signal Swm to the CPU 51.

The latch 50 reads the CCIs from the digital data signal Sad at the timing indicated by the position signal Spc and outputs the CCI signal Scci indicating the contents thereof to the CPU 51.

Figure 5:
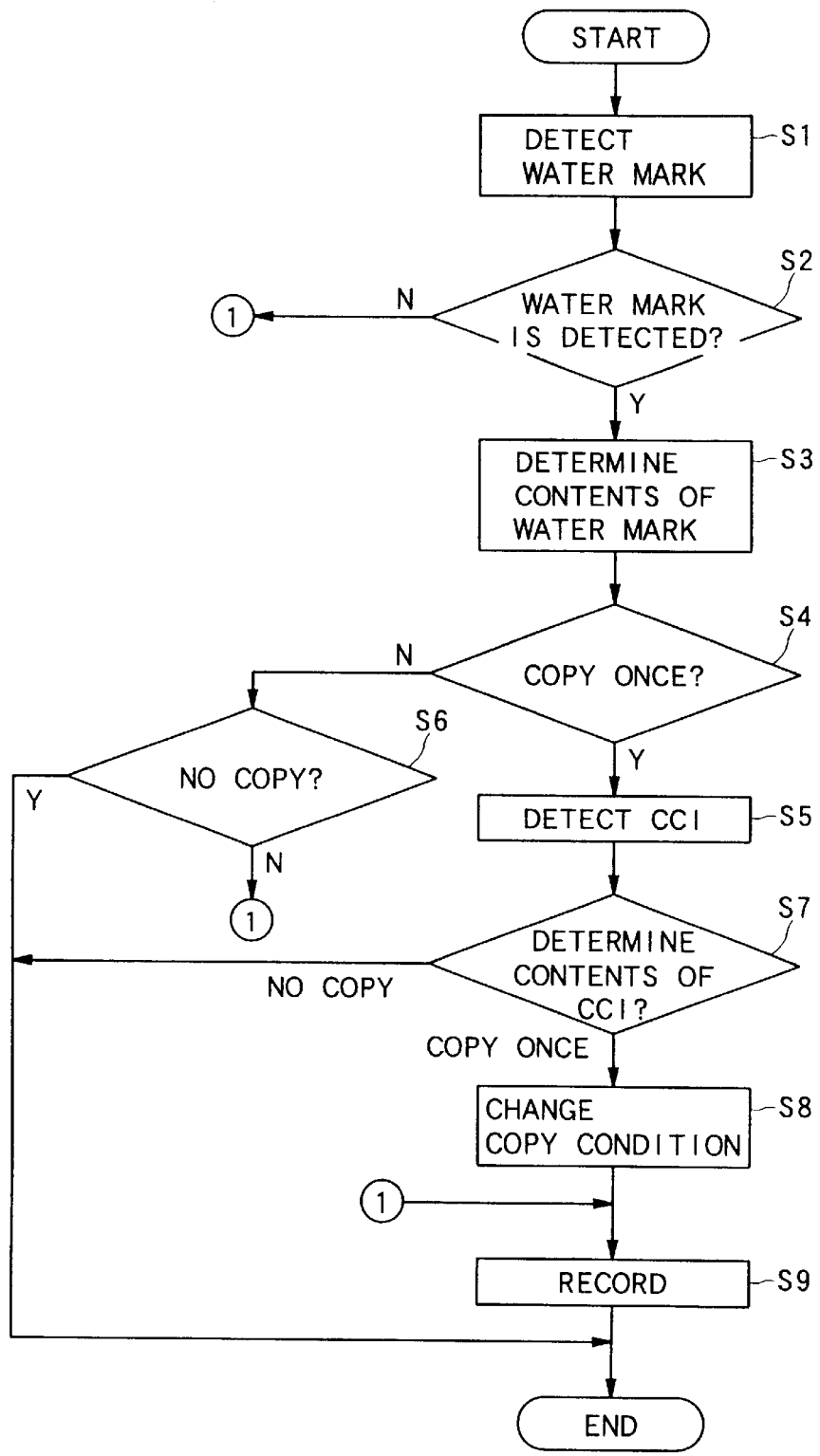
FIG. 5 is a flowchart showing a copying process according to an embodiment of the invention.

The CPU 51, in order to execute the process shown in FIG. 5, outputs a control signal Sc to the switch 56 based on the position signal Spc, the copyright information signal Swm and the CCI signal Scci.

The delay device 52 generates a delay signal Sdl1 by delaying the digital data signal Sad by one clock in terms of the clock signal Sclk and outputs the delay signal Sdl1 to the delay device 53 and one of the input terminals of the switch 56.

The delay device 53 generates a delay signal Sdl2 by delaying the delay signal Sdl1 by one clock in terms of the clock signal Sclk and outputs the delay signal Sdl2 to the adder 54.

The adder 54 generates a sum signal Sadd by adding the delay signal Sdl2 and the digital data signal Sad to each other, and outputs the sum signal Sadd to the divider 55.

The divider 55 generates a quotient signal Sdv by dividing the sum signal Sadd by "2" and outputs the quotient signal Sdv to the other terminal of the switch 56.

The delay devices 52, 53, the adder 54 and the divider 55 have the function of embedding a new CCI in the image data being copied by the copying apparatus C. These devices embed the CCI anew indicating the prohibition of copying the image data, in the case where the CCI embedded in the analog data signal Sad received by the copying apparatus through a broadcasting medium or a transmission medium indicates that the image data can be copied only once. Specifically, the average value is calculated between the value of the luminance contained in the pixel data immediately before the pixel data where the new CCI is embedded and the value of the luminance contained in the pixel data immediately after the pixel data where the new CCI is embedded, and outputs the calculated average value to the switch 56. As a result, the image data being copied by the copying apparatus C constitutes the image data that can no longer be copied.

The switch 56 then switches between the delay signal Sdl1 and the quotient signal Sdv based on the control signal Sc, and outputs one of the signals to the recorder 57 as a recording data signal Srr.

The recording data signal Srr is output from the switch 56 only in the case where the CCI contained in the original analog data signal Sad indicates that the image data can be copied only once. In such a case, the new CCI (i.e. the quotient signal Sdv) described above indicating that the copying is prohibited is output as the recording data signal Srr at predetermined timing for embedding the new CCI.

Subsequently when the recording data signal Srr is output, the recorder 57 records the recording data signal Srr in a recording medium (such as a video tape or a writable optical disk).

Now, the copying process executed by the copying apparatus C will be explained with reference to FIG. 5. This copying process is executed mainly by the CPU 51.

As shown in FIG. 5, the CPU 51 detects the watermark from the digital data signal Sas based on the copyright information signal Swn (step S1).

Then, the CPU 51 determines whether the watermark is detected or not (step S2). In the case where no watermark is detected, the CPU 51 outputs the control signal Sc to the switch 56 in order to copy the digital data Sad. In response to this, the switch 56 is operated to output the delay signal Sdl1 to the recorder 57. As a result, the delay signal Sdl1 is output to the recorder 57 as the recording data signal Srr. The recorder 57 then records the recording data signal Srr in a recording medium (step S9). In this way, the image data in which no watermark is embedded indicates that the copying operation is permitted. Therefore, such image data can be copied without any restriction.

In the case where the watermark is detected, on the other hand, the CPU 51 determines the contents of the watermark thus detected (step S3).

First, the CPU 51 determines whether the watermark is the one indicating that copying is possible only once (step S4). In the case where the watermark indicating that copying is possible only once is not recognized, the CPU 51 controls determines whether the watermark indicates the prohibition of copying or not (step S6). In the case where the watermark indicating the prohibition of copying is recognized, on the other hand, the CPU 51 outputs the control signal Sc to the switch 56 thereby to control the switch 56 and shuts off the output of the recording data signal Srr. Thus, the copying process is ended. As a result, the image data the copying of which is prohibited is not copied.

In the case where neither the watermark indicating that copying is possible only once nor the watermark indicating that copying is prohibited is recognized, the CPU 51 executes step S9 and thereby performs the copying operation.

In the case where the watermark indicating that copying is possible only once is recognized in step S4, on the other hand, the CPU 51 detects the CCI from the digital data signal Sad based on the CCI signal Scci (step S5).

The CPU 51 determines the contents of the CCI detected (step S7). Specifically, the CPU 51 determines whether the offset is added to the average value of luminance by embedding the CCI. In the case where the offset is added, the CPU 51 recognizes that the image data can be copied only once. The CPU 51 then changes the CCI to the quotient signal Sdv (new CCI) output from the divider 56 (step S8), and executes the process of copying the image data (step S9).

In steps S8 and S9, the CPU 51 recognizes the timing at which the CCI embedded in the image data is output to the recorder 57, based on the position information indicating the position of the CCI included in the position signal Spc and the copyright information signal Swm (watermark). Then, the CPU 51 turns the switch 56 from the delay signal Sdl1 to the quotient signal Sdv at this timing. As a result, a new CCI (quotient signal Sdv) is added to the image data or the CCI embedded in the image data is replaced by a new CCI (quotient signal Sdv). This image data is output to the recorder 57 as a recording data signal Srr. As a result, the image data is copied in which the CCI indicating that the image data can be copied only once has been changed to the CCI indicating that copying the image data is prohibited.

In the case where the offset is not added in step S7, on the other hand, the CPU 51 recognizes that copying the image data is prohibited. Then, the CPU 51 controls the switch 56 and thus shuts off the recording data signal Srr. As a result, the image data is not copied. Thus the copying process is ended.

As explained above, since the CCI is embedded in the outer edge area E of the image, the CCI is not erased even if the process for removing the signal corresponding to the vertical blanking time is executed during the image processing. Even in the case where the process is performed for generating the recording data signal Sr with the intention of recording the image data in the DVD, the CCI can be left intact and thus the copying restriction using the CCI can be accurately executed. In this way, the illegal copying can be effectively prevented.

Also, sine the CCI is embedded in the outer edge area E of the image, the image quality deterioration is minimized. Normally, the outer edge area E cannot be visually recognized by the user. Therefore, the image quality is not substantially deteriorated by embedding the CCI. Further, should the outer edge area E is visually recognized by the user, the image quality deterioration is not substantially caused by embedding the CCI, because the outer edge area of the image is neither important nor salient as compared with the central area of the image.

Further, the CCI, which is embedded in the image, can be transmitted without using other circuits than the image processing circuit.

Also, in view of the fact that the watermarks are embedded in the area HR and contain the position information indicating the positions where the CCI is embedded, the copying apparatus C can accurately grasp the positions where the CCI are embedded.

Furthermore, since the CCI is described using the average value of the luminance of a plurality of pixel data, the process for embedding the CCI can be realized while minimizing the deterioration of the image quality of the image data.

Also, since the copyright information is not required to be added or rewritten when copying the recording data signal Srr in other recording media, the configuration of the copying apparatus C can be simplified.

By the way, in the cutting apparatus 1 described above, the CCI is embedded only at one point in the outer edge area E. However, different CCIs can be embedded at a plurality of points not more than 16 points. In this way, the removal of the CCI for theft can be more effectively prevented. Further, even in the case where some CCIs are lost due to noises, the other CCIs can maintain the copying information in the image data.

Also, not only the CCI but also the other information to control operations of the cutting apparatus 1 or the copying apparatus C can be embedded in the outer edge area E of the image. For example, if it is needed to change the operations of the cutting apparatus 1 or the copying apparatus C depending on the kind of medium through which the data signal Sd supplied to the apparatus, information indicating whether the data signal Sd has been supplied through the satellite broadcasting system or the cable television system can be embedded in the outer edge area E.

In addition, the present invention is not limited to the case described above in which the CCI is generated by using the value of the luminance contained in the pixel data immediately before the pixel data existing at the position where the CCI is embedded and the value of the luminance contained in the pixel data immediately after the pixel data existing at the position where the CCI is embedded. For example, the CCI can alternatively be generated by using the luminance contained in two or three vertically adjacent pixel data.

The foregoing description of embodiments refers to the configuration in which the CCI embedding device 3 is included in the cutting apparatus 1. The invention, however, is not limited to this configuration. For example, the CCI embedding device 3 can alternatively be included in the copying apparatus. In such a case, the CCI and the copyright information are embedded by the CCI embedding device 3 in the image signal copied. For the image signal already copied, the copying process is managed based on the CCI and the copyright information embedded.

Also, in the copying apparatus C shown in FIG. 4, instead of inputting the delay signal Sdl2 to one of the input terminals of the switch 56, the quotient signal Sdv with a predetermined offset value added thereto may be input to the same input terminal, which signal is replaced with the original quotient signal Sdv and output to the recorder 57.

Further, the copying apparatus C shown in FIG. 4 may be built in the cutting apparatus, and a recording data signal with a new CCI embedded therein may be generated based on an external data signal with the copyright information and the CCI embedded therein, which signal is recorded in the stamper disk thereby to produce the DVD.

The foregoing description about the copying apparatus C according to the first embodiment refers to the case of copying the analog data signal Sa input through a broadcasting medium such as the satellite broadcasting system or a transmission medium such as the cable television system. In addition to this application, a configuration is possible in which the image signal (the image signal with the copyright information and the CCI embedded therein) reproduced from the DVD produced by the cutting apparatus 1 is input to and copied by the copying apparatus C.

IV. Another version of CCI embedding device

Figure 6:
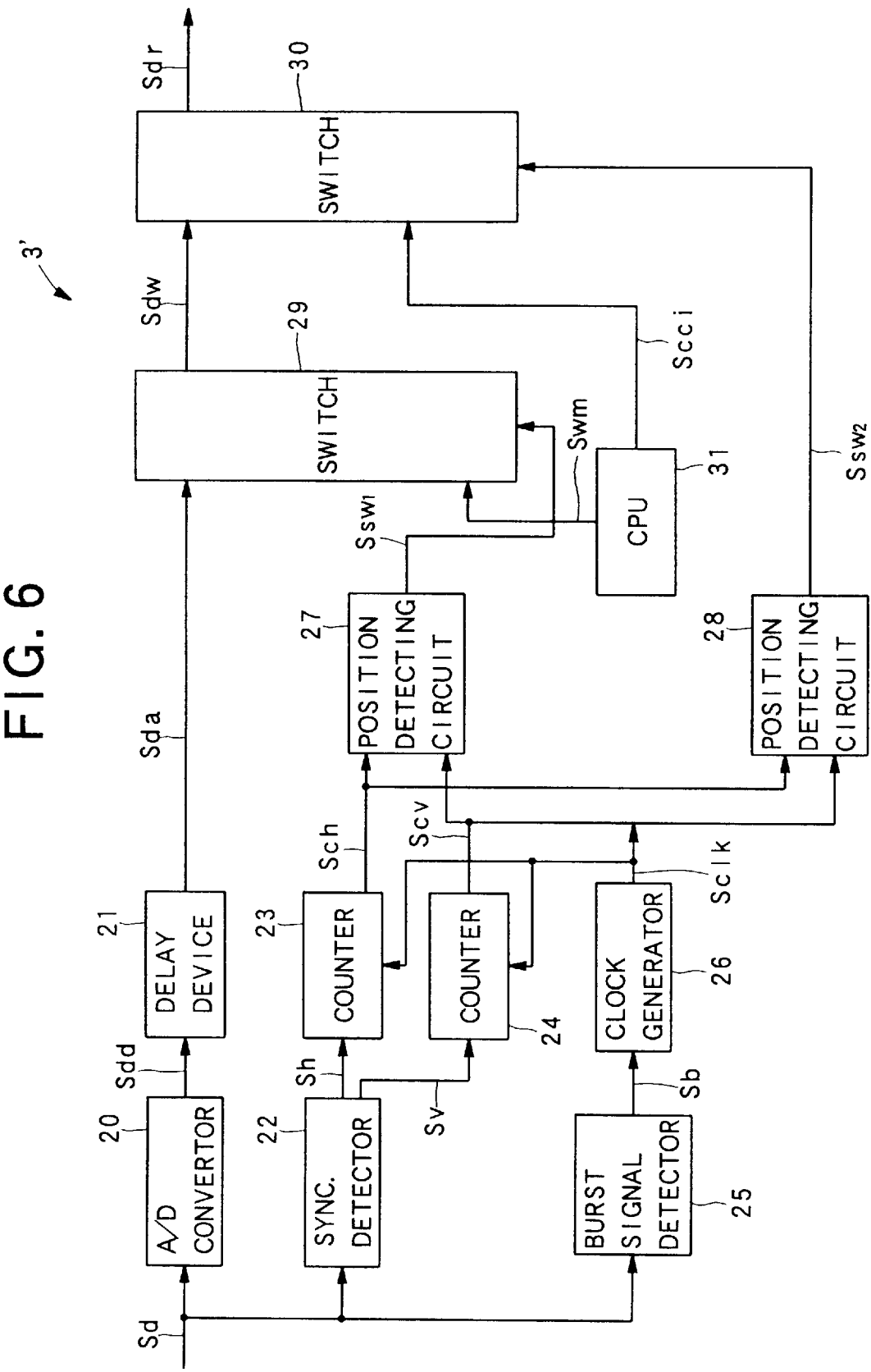
FIG. 6 is a block diagram showing another CCI embedding device according to an embodiment of the invention.

FIG. 6 shows a configuration of another CCI embedding device 3' according to an embodiment of the invention. In the cutting apparatus 1 described above, the CCI embedding device 3 may be replaced with the CCI embedding device 3'. In FIG. 6, the component members similar to the corresponding component members of the CCI embedding device 3 shown in FIG. 3 are designated by the same reference numerals, respectively, and will not be further described.

With the CCI embedding device 3 described above, the average value of luminance is calculated, and this average value or the same average value with an offset value added thereto is used as the CCI. With the CCI embedding device 3', in contrast, a preset fixed value is used as the CCI.

For example, a fixed value "00001000" is used as a CCI indicating that copying is possible only once, and a fixed value "00001xxx" is used as a CCI indicating that copying is prohibited, where x designates an arbitrary value. When embedding an CCI, one of these fixed values is output to the switch 30 from the CPU 31'.

In the case where a fixed value is used as a CCI, the calculation of the average luminance value is not required. Also, the digital data signal Sdd and the position signal Ssw2 are not required to be supplied to the CPU 31' of the CCI embedding device 3'. Therefore, the CCI embedding device 3' can simplify the circuit configuration.

V. Another Version of Copying Apparatus

Figure 7:
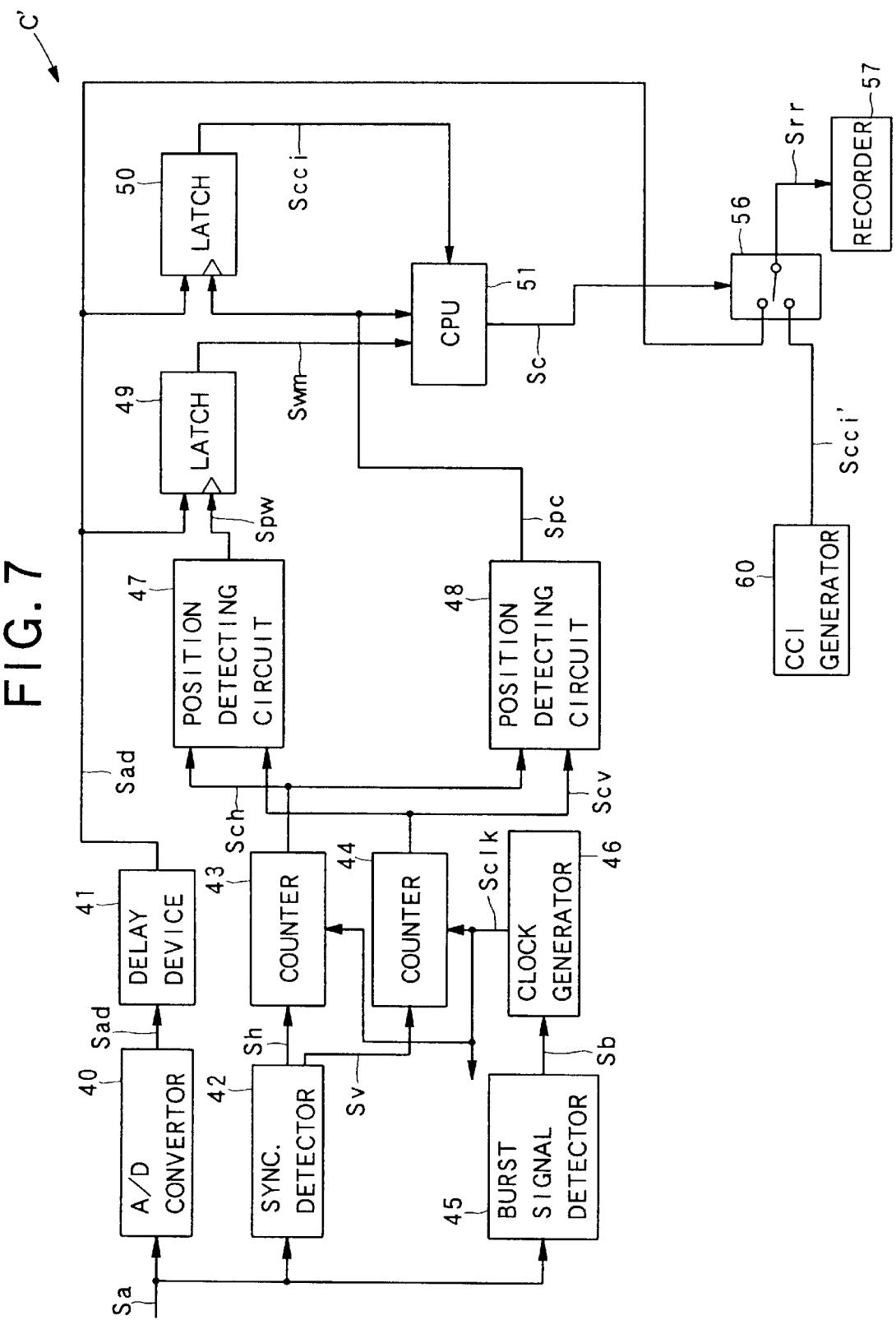
FIG. 7 is a block diagram showing another copying apparatus according to an embodiment of the invention.

FIG. 7 shows a configuration of another copying apparatus C' according to an embodiment of the invention. In FIG. 7, the component members similar to the corresponding ones of the copying apparatus C shown in FIG. 4 are designated by the same reference numerals, respectively, and will not be further described.

In the copying apparatus C described above, the average value of luminance is used as a new CCI when embedding the new CCI in the image data to be copied. The copying apparatus C', in contrast, uses a preset fixed value as a new CCI.

For this reason, the copying apparatus C' comprises a CCI generator 60 in place of the delay devices 52, 53, the adder 54 and the divider 55 shown in FIG. 4. The CCI generator 60 outputs a CCI signal Scci' containing a CCI (a fixed value "00001xxx", for example) indicating that copying is prohibited. This CCI signal Scci' is input to one of the input terminals of the switch 56 while the digital data signal Sad is input directly to the other input terminal thereof. The switch 56 is turned to the CCI signal Scci' at a timing when the CCI is embedded in the digital data signal Sad and the recording data signal Srr is output. As a result, the CCI is embedded. In this case, the CPU 51 is supplied with the CCI signal Scci' detected from the digital data signal Sad by the latch 50. The copying apparatus C' which uses a fixed value as a CCI eliminates the calculation of the average luminance value and thus can simplify the circuit configuration.

In the case where information indicating which medium is used for inputting the data signal Sd, a satellite broadcasting system or a cable television system, is embedded in the image data by a method similar to the one using the CCI, the number of types of fixed value is increased. For example, a fixed value "00001xxx" is used for indicating the image supplied by satellite broadcasting. Also, "00011xxx" is used as a fixed value indicating the image supplied from the DVD.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-125114 filed on May 7, 1998 including the specification, claims, drawings and summary is incorporated herein by reference in its entirety.

What is claimed is:

1. An apparatus for generating a recording signal by converting an image signal and outputting the generated recording signal to an external device, a time corresponding to the image signal including a horizontal scanning time and a horizontal blanking time, the apparatus comprising:

a control information placing device for placing a control information piece onto the image signal corresponding to an invisibly displayed time in the horizontal scanning time, the control information piece including information to control an operation of the external device; and a generating device for generating the recording signal by converting the image signal including the control information pieces, wherein the control information placing device comprises:

a calculation device for calculating an average value of a first luminance value included in the data piece previous to a target data piece onto which the control information piece is to be placed and a second luminance value included in the data piece next to the target data piece; and a generation device for generating the control information piece on the basis of the calculated average value.

2. The apparatus according to claim 1, wherein the image signal corresponding to the invisibly displayed time is displayed on a portion located outside a visible region of a display screen of a display device when an image corresponding to the image signal is displayed on the display screen.

3. The apparatus according to claim 1, wherein the image signal corresponding to the invisibly displayed time is displayed on a portion hidden by a screen frame of a display screen of a display device when an image corresponding to the image signal is displayed on the display screen.

4. The apparatus according to claim 1, wherein the control information placing device places a plurality of control information pieces onto a plurality of data pieces each corresponding to different one of the plurality of image elements that is to be located at a portion on a display screen of a display device where the image signal corresponding to the invisibly displayed time is displayed when an image corresponding to the image signal is displayed on the display screen.

5. The apparatus according to claim 1, wherein the control information piece includes copy condition information indicating whether or not copying the recording signal is permitted.

6. The apparatus according to claim 1, wherein each of the plurality of data pieces is pixel data corresponding to a pixel of an image corresponding to the image signal.

7. The apparatus according to claim 1, wherein the generation device outputs the average value directly as the control information piece when the control information piece indicates that copying the image signal is prohibited, and the generation device outputs the average value plus a predetermined offset value as the control information piece when the control information piece indicates that copying the image signal is permitted only once.

8. An apparatus for generating a recording signal by converting an image signal and recording the generated recording signal onto a recording medium readable by an external device for reproducing the recording signal, a time corresponding to the image signal including a horizontal scanning time and a horizontal blanking time, the apparatus comprising:

a control information placing device for placing a control information piece onto the image signal corresponding to an invisibly displayed time in the horizontal scanning time, the control information piece including information to control an operation of the external device;

a generating device for generating the recording signal by converting the image signal including the control information piece; and a recording device for recording the generated recording signal onto the recording medium, wherein the control information placing device comprises:

a calculation device for calculating an average value of a first luminance value included in the data piece previous to a target data piece onto which the control information piece is to be placed and a second luminance value included in the data piece next to the target data piece; and a generation device for generating the control information piece on the basis of the calculated average value.

9. The apparatus according to claim 8, wherein the image signal corresponding to the invisibly displayed time is displayed on a portion located outside a visible region of a display screen of a display device when an image corresponding to the image signal is displayed on the display screen.

10. The apparatus according to claim 8, wherein the image signal corresponding to the invisibly displayed time is displayed on a portion hidden by a screen frame of a display screen of a display device when an image corresponding to the image signal is displayed on the display screen.

11. The apparatus according to claim 8, wherein the control information placing device places a plurality of control information pieces onto a plurality of data pieces each corresponding to different one of the plurality of image elements that is to be located at a portion on a display screen of a display device where the image signal corresponding to the invisibly displayed time is displayed when an image corresponding to the image signal is displayed on the display screen.

12. The apparatus according to claim 8, wherein the control information piece includes copy condition information indicating whether or not copying the recording signal is permitted.

13. The apparatus according to claim 8, wherein each of the plurality of data pieces is pixel data corresponding to a pixel of an image corresponding to the image signal.

14. The apparatus according to claim 8, wherein the generation device outputs the average value directly as the control information piece when the control information piece indicates that copying the image signal is prohibited, and the generation device outputs the average value plus a predetermined offset value as the control information piece when the control information indicates that copying the image signal is permitted only once.

15. A recording medium on which reproduction data intended for a reproduction of an image is recorded, the reproduction data comprising:

image data corresponding to the image to be displayed on a display screen of a display device, the image data comprising a plurality of data pieces each corresponding to different one of a plurality of image elements which compose the image; and a copy condition information piece placed on one of the plurality of data pieces corresponding to one of the plurality of image elements that is to be located at a portion corresponding to an invisibly displayed time in a horizontal scanning time of an image signal corresponding to the image data when the image is displayed on the display screen, the copy condition information piece being generated on the basis of an average value and indicating whether or not copying the image data is permitted, the average value being an average value of a first luminance value included in the data piece previous to a target data piece onto which the copy condition information piece is to be placed and a second luminance value included in the data piece next to the target data piece.

16. The recording medium according to claim 15, wherein the portion corresponding to the invisibly displayed time of the image signal is a portion located outside a visible region of the display screen.

17. The recording medium according to claim 15, wherein the portion corresponding to the invisibly displayed time of the image signal is a portion hidden by a screen frame of the display device.

18. The recording medium according to claim 15, wherein the reproduction data includes a plurality of the copy condition information pieces into a plurality of data pieces each corresponding to different one of the plurality of image elements that is to be located at the portion corresponding to the invisibly displayed time of the image signal.

19. The recording medium according to claim 15, wherein each of the plurality of data pieces is pixel data corresponding to a pixel of the image.

20. An apparatus for copying reproduction data intended for reproducing an image with an external device, the reproduction data comprising:

image data corresponding to the image to be displayed on a display screen of a display device, the image data comprising a plurality of data pieces each corresponding to different one of a plurality of image elements which compose the image; and a copy condition information piece placed on one of the plurality of data pieces corresponding to one of the plurality of image elements that is to be located at a portion corresponding to an invisibly displayed time in a horizontal scanning time of an image signal corresponding to the image data when the image is displayed on the display screen, the copy condition information piece being generated on the basis of an average value and indicating whether or not copying the image data is permitted, the average value being an average value of a first luminance value included in the data piece previous to a target data piece onto which the copy condition information piece is to be placed and a second luminance value included in the data piece next to the target data piece, wherein the apparatus comprising:

an extraction device for extracting the copy condition information piece from the reproduction data;

a determination device for determining on the basis of the extracted copy condition information piece whether or not copying the image data is permitted; and a copying device for copying the reproduction data if the determination device determines that copying the image data is permitted.

21. The apparatus according to claim 20, wherein the copying device includes a replacing device for replacing the copy condition information piece currently placed on the data piece included in the image data with a new copy condition information piece indicating that copying the image data is prohibited.

22. An apparatus for generating a recording signal by converting an image signal and outputting the generated recording signal to an external device, a time corresponding to the image signal including a horizontal scanning time and a horizontal blanking time, the apparatus comprising:

an information placing device for placing a copy condition information piece onto the image signal corresponding to an invisibly displayed time in the horizontal scanning time; and a generating device for generating the recording signal by converting the image signal including the copy condition information pieces, wherein the information placing device comprises:

a calculation device for calculating an average value of a first luminance value included in the data piece previous to a target data piece onto which the control condition information piece is to be placed and a second luminance value included in the data piece next to the target data piece; and a generation device for generating the control condition information piece on the basis of the calculated average value.

23. An apparatus for generating a recording signal by converting an image signal and recording the generated recording signal onto a recording medium readable by an external device for reproducing the recording signal, a time corresponding to the image signal including a horizontal scanning time and a horizontal blanking time, the apparatus comprising:

an information placing device for placing a copy condition information piece onto the image signal corresponding to an invisibly displayed time in the horizontal scanning time;

a generating device for generating the recording signal by converting the image signal including the copy condition information piece; and a recording device for recording the generated recording signal onto the recording medium, wherein the information placing device comprises:

a calculation device for calculating an average value of a first luminance value included in the data piece previous to a target data piece onto which the copy control information piece is to be placed and a second luminance value included in the data piece next to the target data piece; and a generation device for generating the copy control information piece on the basis of the calculated average value.

* * * * *